Feb. 4, 1930.  E. L. BARNES  1,746,068
FLUID TIGHT SEAL
Filed Nov. 13, 1926
FIG. I.
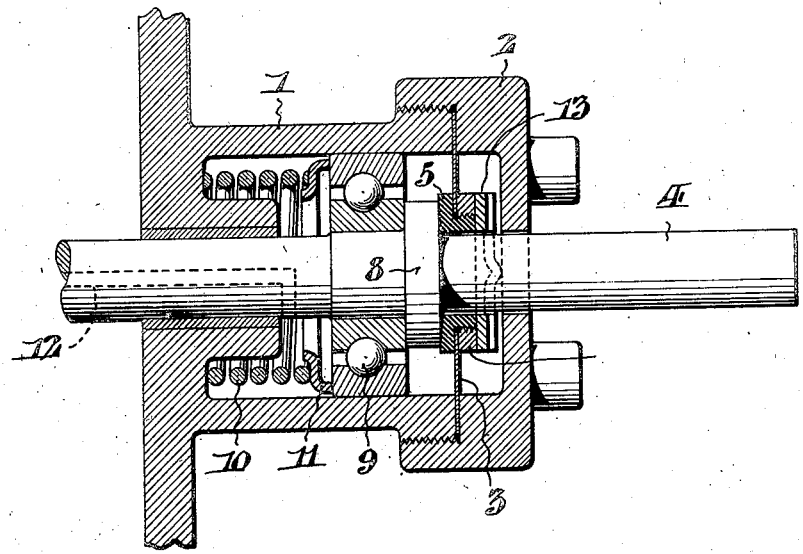
FIG. II.
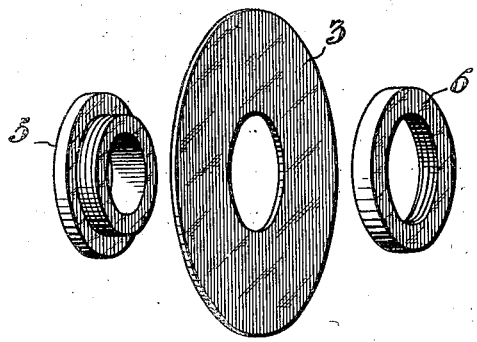
FIG. III.
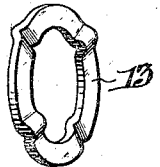
WITNESSES
INVENTOR:
Eugene L. Barnes,
BY
ATTORNEYS.

Patented Feb. 4, 1930

1,746,068

UNITED STATES PATENT OFFICE

EUGENE L. BARNES, OF BUFFALO, NEW YORK, ASSIGNOR TO THE BARBER ASPHALT COMPANY, OF PHILADELPHIA, PENNSYLVANIA, A CORPORATION OF WEST VIRGINIA

FLUID-TIGHT SEAL

Application filed November 13, 1926. Serial No. 148,200.

My invention relates to seals useful in preventing the passage of fluid around shafts for pumps or the like and is of particular utility in connection with compressor pumps of the kind used in refrigerating apparatus. The invention has for its object the provision of a suitable shaft bearing and seal through which there can be no escape of high pressure fluid.

In refrigerating apparatus it is particularly important that there be no escape of refrigerant gas from the system on account of the necessity of retaining a constant quantity of gas in the system for proper operation, and also because of the deleterious effect of certain gases when inhaled. A common difficulty with seals which are designed to accommodate shafts revolved at relatively high speeds is that lateral vibration due to centrifugal action and thrust which accompanies rotation of the shafts causes the bushings to wear rapidly with resulting loss in effectiveness of the seal. To overcome this difficulty I have provided means capable of compensating for thrust and vibration and for maintaining a fluid-tight seal at all times.

Supplementing the advantages already described, are those derived from combining the parts of a shaft bearing and seal in a compact assemblage.

While I have illustrated and described my invention as a seal for a pump chamber in a refrigerating system, this being its preferred embodiment, I do not wish it to be understood that its use is in any way limited to such purpose as it is readily apparent that the invention is capable of numerous other adaptations.

In the accompanying drawings Fig. I is a sectional view of the complete seal.

Fig. II is a perspective view of the diaphragm, bushing and retaining nut.

Fig. III is a perspective view of an improved form of washer the functions of which will be more fully described.

Referring to Fig. I, I have shown the seal as an integral part of a pump chamber, the cup-shaped flange 1 being a fragment of the pump casing. This member 1 is externally threaded to engage the cooperatively threaded cap-piece 2 and forms with it a suitable housing for the other parts. Between the housing members 1 and 2 a flexible diaphragm 3 is interposed, the latter having a central opening to permit the passage of the shaft 4 and the bushing 5. The diaphragm 3 is subject to fluid pressure from the interior of the housing. The bushing 5 is preferably of fiber or other non-frictional material and is threaded to receive a nut 6 which serves to hold it tightly against the diaphragm 3. A collar 8 on the drive shaft 4 engages with the bushing 5, forming at this point a pressure seal which prevents the passage of refrigerant or other fluid around the shaft.

The shaft 4 is journalled in the ball bearing 9 which is movable in the annular interval between the shaft and its housing and held in place by means of a helical spring 10 and washer 11. The spring 10 further serves to induce axial thrust on the shaft through the ball bearing 9, and together with the diaphragm 3 keeps the shaft collar in pressure engagement with the bushing 5, thus insuring against any leakage through the seal. As shown at 12 the shaft is hollowed to provide a lubricant duct for the bearing. In case it is desirable to employ the fluid actuated by the pump as a lubricating medium, this duct is provided with free access to the pump chamber. Otherwise, oil or other lubricating substance may be introduced to the bearing. Owing to the peculiar design of the flanged member 1, the lubricant is readily retained in and about the ball bearing 9.

Interposed between the bushing 5 and cap-piece 2 is a washer 13 with offsets projecting outward from opposite sides, said offsets being arranged in diametrical pairs at right angles as best shown in Fig. III. On account of its peculiar construction, the washer is conveniently termed a "wabble washer", its function being to adapt itself positionally to any tilt of the contacting surfaces at the point of seal induced by wabble or flexure of the right-hand portion of the shaft 4 (Fig. 1) under centrifugal action.

It will be observed that the wabble washer 13, the diaphragm 3 and the helical spring 10 all cooperate to firmly hold the bushing 5 against the shaft collar 8, thus forming a fluid-tight seal at this point, capable of withstanding vibration and wabble attendant upon rotation of the shaft at a relatively high speed.

Having thus described my invention, I claim:

1. In a seal for a shaft, the combination of a housing to accommodate the seal, a diaphragm with its circumferential margin fixed in said housing, a bushing carried by the diaphragm to engage a lateral shoulder on the shaft, a ball bearing movable in the interval between the shaft and its housing, and means for inducing through said ball bearing axial thrust on the shaft to maintain the shoulder in fluid-tight pressure contact with the bushing aforesaid, notwithstanding vibration.

2. In a seal for a shaft, the combination of a housing to accommodate the seal, a diaphragm with its circumferential margin fixed in said housing, a bushing carried by the diaphragm to engage one side of a collar on the shaft, a ball bearing movable in the interval between the shaft and its housing and engaging the other side of said shaft collar, means for inducing through said ball bearing axial thrust on the shaft to maintain the collar in fluid-tight pressure contact with the bushing aforesaid and means to sustain the bushing against the thrust and permit tilting of the contacting surfaces together, without loss of contact, owing to wabble or flexure of the shaft.

3. In a sealing means for a shaft, a housing through which the shaft extends, a shoulder carried by the shaft, a bushing around the shaft engaging with said shoulder, a diaphragm around said shaft sealed to said bushing and marginally secured to the housing, a washer with diametrically opposed offsets on one side contacting with the bushing and diametrically opposed offsets on the other side contacting with a wall of the housing, and means for maintaining pressure contact between the shoulder and bushing.

In testimony whereof I have hereunto signed my name at Buffalo, New York, this eighth day of November, 1926.

EUGENE L. BARNES.